United States Patent
Moretti

(10) Patent No.: US 10,407,096 B2
(45) Date of Patent: Sep. 10, 2019

(54) SECURING OF A DRIVING ASSISTANCE FUNCTION WITHIN A POWER STEERING

(71) Applicant: JTEKT EUROPE, Irigny (FR)

(72) Inventor: Romain Moretti, Soucieu en Jarrest (FR)

(73) Assignee: JTEKT EUROPE, Irigny (FR)

(*) Notice: Subject to any disclaimer, the term of this patent is extended or adjusted under 35 U.S.C. 154(b) by 158 days.

(21) Appl. No.: 15/511,551

(22) PCT Filed: Oct. 1, 2015

(86) PCT No.: PCT/FR2015/052628
§ 371 (c)(1),
(2) Date: Mar. 15, 2017

(87) PCT Pub. No.: WO2016/055719
PCT Pub. Date: Apr. 14, 2016

(65) Prior Publication Data
US 2017/0282972 A1 Oct. 5, 2017

(30) Foreign Application Priority Data
Oct. 7, 2014 (FR) .................................. 14 59590

(51) Int. Cl.
*B62D 15/02* (2006.01)
*B60W 50/04* (2006.01)
(Continued)

(52) U.S. Cl.
CPC .......... *B62D 15/025* (2013.01); *B60W 50/04* (2013.01); *B62D 6/00* (2013.01); *B62D 15/0265* (2013.01);
(Continued)

(58) Field of Classification Search
CPC .... B62D 5/046; B62D 5/0406; B62D 5/0463; B62D 15/025; B62D 6/00; B62D 15/0265;
(Continued)

(56) References Cited

U.S. PATENT DOCUMENTS 6,380,706 B1 * 4/2002 Kifuku ................. B62D 5/0463
318/434
6,876,920 B1 * 4/2005 Mailer ................... A01B 69/00
342/457

(Continued)

FOREIGN PATENT DOCUMENTS

| DE | 10 2013 204842 A1 | 9/2013 |
| EP | 2 141 057 A1 | 1/2010 |
| JP | 2013-079875 A | 5/2013 |

OTHER PUBLICATIONS

Feb. 12, 2016 International Search Report issued in International Patent Application No. PCT/FR2015/052628.

*Primary Examiner* — Behrang Badii
(74) *Attorney, Agent, or Firm* — Oliff PLC

(57) ABSTRACT

A method of controlling a power steering system including at least one course control function, whereby a position setpoint is determined automatically according to a reference course that a vehicle is to be made to follow, then a motor setpoint applied to an assistance motor is adjusted accordingly, the method including a safety function which is distinct from the course control function and meets a higher ASIL safety level according to ISO-26262 standard, said safety function including a diagnostics subfunction according to which a control parameter such as the angular position of the steering wheel, the driver torque applied to the steering wheel, or the rate at which the steering wheel is turned is monitored in order to detect the onset of an alert situation considered to be hazardous, then an intervention (Continued)

subfunction according to which, if an alert situation is detected, the course control function is neutralized.

11 Claims, 2 Drawing Sheets

(51) Int. Cl.
*B62D 6/00* (2006.01)
*B60T 7/12* (2006.01)
*G06F 17/00* (2019.01)
*B60T 8/1755* (2006.01)
*A01B 69/00* (2006.01)
*B62D 5/04* (2006.01)
*B60W 10/06* (2006.01)
*G01C 21/00* (2006.01)
*B60W 30/02* (2012.01)

(52) U.S. Cl.
CPC .............. *A01B 69/00* (2013.01); *B60T 7/12* (2013.01); *B60T 8/1755* (2013.01); *B60W 10/06* (2013.01); *B60W 30/02* (2013.01); *B62D 5/04* (2013.01); *B62D 5/0406* (2013.01); *B62D 5/046* (2013.01); *B62D 5/0463* (2013.01); *B62D 5/0472* (2013.01); *B62D 5/0481* (2013.01); *G01C 21/00* (2013.01); *G06F 17/00* (2013.01)

(58) Field of Classification Search
CPC ........ B62D 9/005; B62D 1/286; A01B 69/00; G05D 1/02; G05D 1/0278; G05D 1/0206; B60T 7/12; B60T 8/17557; B60T 8/1755; B60T 8/246; B60T 8/17; B60W 40/10; B60W 50/04; B60W 10/06; B60W 10/18; B60W 30/10; B60W 20/00; B63H 25/04; B63H 20/007; B60L 50/64; B60L 58/22; B60L 50/66; B60L 1/003; B60L 7/18; B60L 11/1868; B60L 15/2009; B60L 58/12; G01C 21/00; G01C 21/203; H05K 1/18; H02K 11/21; H02K 11/33; G01S 19/13; H04L 67/10; H04L 67/04; H04L 67/12; H04L 67/02; H04L 67/18; H01M 16/00; H01M 2/1077; H01M 10/0525; H01M 10/441; H01M 10/06; B60R 16/033

See application file for complete search history.

(56) References Cited

U.S. PATENT DOCUMENTS

| | | | |
|---|---|---|---|
| 2002/0166716 A1* | 11/2002 | Shimizu | B62D 5/0406 180/446 |
| 2003/0071587 A1* | 4/2003 | Suzuki | B62D 5/046 318/139 |
| 2008/0047776 A1* | 2/2008 | Kobayashi | B62D 5/046 180/446 |
| 2008/0308342 A1* | 12/2008 | Nishimori | B62D 5/0472 180/446 |
| 2011/0231052 A1* | 9/2011 | Ellis | B60T 7/12 701/31.4 |
| 2013/0274985 A1 | 10/2013 | Lee et al. | |

* cited by examiner

SECURING OF A DRIVING ASSISTANCE FUNCTION WITHIN A POWER STEERING

The present invention concerns the methods for managing power steering devices of motor vehicles, and more particularly the methods for managing power steering devices comprising driving assistance functions, intended to automatically ensure a control of the path of the vehicle, such as for example the lane keeping assist functions.

Currently, the driving assistance functions allowing an automatic control of the path of a motor vehicle tend to multiply in order to improve the safety and the comfort of the users of motor vehicles.

However, to the extent that such path control functions ensure autonomously a real automatic piloting of the concerned vehicle by controlling by themselves the configuration of the steering system which will make it possible to follow a reference path determined by said path control functions, it is essential, for the safety of the vehicle occupants and of the other road users, that such functions comply with particularly high safety standards.

To this end, the safety standard ISO-26262 proposes defining, from a risk analysis, «ASIL» safety levels («Automotive Safety Integrity Level»), denoted, from the lowest to the most demanding, «QM» («Quality Management», that is to say not relevant to safety), then «A», «B», «C» and finally «D», and which are determined by characterizing each possible dangerous situation (or «dangerous event») by three parameters:

- the severity thereof, that is to say the degree of seriousness of the injuries likely to be inflicted on the occupant of the vehicle (from S0 for the absence of injury to S3 for a critical or deadly injury);
- the exposure thereof, that is to say the predictable frequency of occurrence of operating conditions under which an injury is likely to happen (from an almost-zero E0, or very low E1, probability, according to which the injury happens only under rare operating conditions, to a high probability E4, in which it is almost sure that an injury happens under most operating conditions), and
- the controllability thereof, that is to say the probability that the driver could act (or react) so as to control the situation and avoid the injury (from a generally controllable situation C0 to a hardly controllable or even completely uncontrollable situation C3).

The ASIL level depends on the combination (the product) of these three parameters.

Thus, as example, a dangerous event causing critical injuries S3, with a high probability of occurrence E4, and uncontrollable C3, will fall within the ASIL D level (the highest).

In contrast, the same uncontrollable event C3 and causing critical injuries S3, but having a lower probability of occurrence, lower by one or several degree(s) with respect to the maximum degree, will consequently have its ASIL level lowered by one or several degree(s). In this example, the ASIL level will be therefore brought to C in the case of an exposure E3, or even to A in the case of an exposure E1.

In practice, path control functions must meet (be certified for) an ASIL safety level at least equal to B, C, or even D.

This imposes enhancing the reliability not only of the acquisition of data that are necessary for the automatic regulation, but also of the processing algorithms of these data, and this over the entire path control chain.

Hence, such a safety requirement first imposes using relatively sophisticated sensors, such as high-definition and high-speed cameras allowing following accurately the pavement marking that delimits the traffic lane, and in addition generally implementing a plurality of redundant sensors contributing to the same function, in order to gain accuracy and/or maintain the function despite the (temporary or definitive) possible failure of one of said sensors.

This naturally tends to increase the cost and the weight of the steering management device embedded on the vehicle.

In addition, this same safety requirement requires providing, over the entire control chain, for complex processing algorithms, provided in particular with detailed analysis functions (for example fast image processing), noise filtering functions intended to improve the quality of the perceived signals, safety functions intended to identify and deal with possible failures in the acquisition chain or in the calculation chain, or still further redundant checking functions, intended to calculate, check and/or validate a same result by several different calculations and/or by using several types of information coming from distinct sources, in order to guarantee the safe operation of the whole even in the case of a measurement error affecting a signal or in the case of a failure of one of the functions.

Yet, the complexity of such algorithms makes their execution relatively intensive in terms of calculation resources and energy, but also and especially quite slow, whereas, precisely, the driving assistance functions sometimes requires a very short response time, in particular to ensure a path control while the vehicle is moving at high speed (typically for following a traffic lane on highway).

Consequently, the objects assigned to the invention aim to overcome the aforementioned drawbacks, and to propose a new method for managing a power steering which combines, at a lower cost and without making the vehicle heavier, high safety requirements with good performances in terms of response time.

The objects assigned to the invention are achieved by means of a method for managing a power steering of a vehicle comprising at least one path control function, according to which a motor setpoint is automatically adjusted and applied to an assist motor of the power steering so that the vehicle automatically follows an actual path which is close to, or which coincides with, a reference path that the vehicle is desired to follow, said method comprising more preferably a path control function according to which a position setpoint is automatically determined according to a reference path that the vehicle is desired to follow and then a motor setpoint is automatically adjusted and applied to the assist motor so as to make the effective position of the power steering converge toward said position setpoint, said method being characterized in that it comprises a securing function, distinct from the path control function and which meets an ASIL safety level higher than said path control function according to the safety standard ISO-26262, said securing function comprising a diagnosis sub-function according to which is monitored a control parameter, representative of the behavior of the vehicle, such as a measurement or an estimate of the angular position of the steering wheel, a measurement or an estimate of the driver torque exerted by the driver on the steering wheel, or a measurement or an estimate of the angular rotational speed of the steering wheel, in order to detect, by comparison of said control parameter with a predetermined alert threshold, the occurrence of a predefined alert situation, considered as dangerous, the securing function comprising afterwards an intervention sub-function according to which, in the case of detection of an alert situation, the moderation and/or the neutralization of the path control function is forced.

Advantageously, the invention proposes to dissociate the securing function from the path control function, thus making it possible to have the constraint of the high safety level assumed by the sole securing function, whereas the path control function is in itself relieved from such a safety constraint.

Indeed, it is no longer necessary to intrinsically secure the signals acquired or used by the path control function, nor the processing algorithms implemented by said path control function, since this securing role rests entirely with the securing function.

To this end, the securing function, the execution of which takes place in parallel with and independently from the normal course of the path control function, monitors the behavior of the vehicle, by means of a specifically dedicated and secure data acquisition and calculation branch, distinct from the path control branch, in order to detect the possible occurrence of an alert situation considered as dangerous, and reacts, in the case of an alert situation, by moderating or even by neutralizing the path control function, that is to say by attenuating, or even by blocking or by cancelling the influence of said path control function on the determination and the adjustment of the behavior of the power steering, and more particularly by attenuating, or even by blocking or by cancelling the influence of said path control function on the adjustment of the motor setpoint which is applied to the assist motor.

In other words, the invention proposes to ensure the safety of the whole management method by a securing function which runs as a «background task», which relies on its own signal(s) (the control parameter), secured at the desired ASIL level, and its own processing algorithms, secured at the desired ASIL level, and which intervenes, when said securing function considers it necessary for maintaining the safety of the occupants of the vehicle, by overriding the path control function in order to neutralize a posteriori said path control function, at "the end of chain" (somewhat like a circuit breaker which interrupts the setpoint signal(s) which come from said path control function and which are intended to adjust the motor setpoint, regardless of the value of said setpoint signal(s) developed by said path control function).

Advantageously, securing only a portion of the processes implemented in the power steering management method according to the invention is therefore sufficient to secure, at the required ASIL level, the whole of said management method.

In practice, it suffices therefore to give the desired ASIL safety level to the (sole) securing function, by securing at said ASIL level the acquisition of the control parameter and the processing of said control parameter which allows the detection of a dangerous situation, so as to globally obtain a full securing of the path control function which is monitored, and therefore "protected", by said securing function, wherein said full securing is certified at the same above-mentioned ASIL level as set by the securing function.

Therefore, thanks to the management architecture proposed by the invention, the path control function may have a simple, inexpensive and non-redundant structure, which will use for example low-cost, light, and compact sensors, as well as calculation algorithms which are not very complex and therefore particularly rapid and not very intensive in terms of calculation resources.

Advantageously, thanks to the separation of roles, the path control function may focus on the performances, in particular the dynamic performances (the path control then having a particularly short response time), regardless of its intrinsic safety level, whereas the securing function seeks, in the background, to impose generally a sufficient safety level onto the whole.

In other words, the invention allows combining the simplicity and the rapidity of execution of a (relatively simplified) main path control function with the operation safety conferred by an isolated auxiliary securing function, capable of intervening, when necessary, to make said main path control function ineffective, in order to avoid any dangerous and uncontrollable drift of the automatic piloting of the vehicle.

Other objects, features and advantages of the invention will appear in more detail upon reading the following description, as well as with reference to the appended drawings, provided only for an illustrative and non-restrictive purpose, among which:

The present invention relates to a method for managing a power steering of a vehicle, and more particularly a motor vehicle.

In a manner known per se, said power steering, and more particularly the mechanism of said power steering, comprises at least one steering wheel 1, allowing the driver to act on the power steering so as to manually control the steering maneuver.

The power steering also comprises at least one assist motor 2, intended to supply a force, and more particularly a torque, for assisting the maneuver of the steering.

It is possible to consider indifferently any type of assist motor 2, and more particularly any type of two-way operation assist motor, and in particular a rotary assist motor or a linear assist motor.

Moreover, said assist motor 2 may be for example hydraulic or, preferably, electric (the use of an electric motor facilitating in particular the setting-up and the implementation of said motor, as well as the generation and the management of the useful signals).

In a particularly preferred manner, the assist motor 2 will be a rotary electric motor, for example of the «brushless» type.

Moreover, the power steering preferably comprises, in a manner known per se, a steering column 3, driven by the steering wheel 1 and which meshes, by means of a pinion, on a steering rack (not represented) that is slidably mounted in a steering casing secured to the chassis of the vehicle.

Each of the ends of the steering rack is preferably linked, via a steering tie rod, to a yaw-orientable knuckle, on which a steered (and preferably drive) wheel of the vehicle is mounted, so that the displacement of the rack in translation in the casing causes a modification of the steering angle (i.e. the yaw orientation) of said steered wheels.

In particular, the assist motor 2 may be engaged on the steering column 3, for example via a worm wheel and worm screw reducer, or may be engaged directly on the steering rack, by a ball screw type driving mechanism or via a motor pinion distinct from the pinion of the steering column (thereby forming a steering mechanism called «dual-pinion» steering mechanism).

Figure 1:
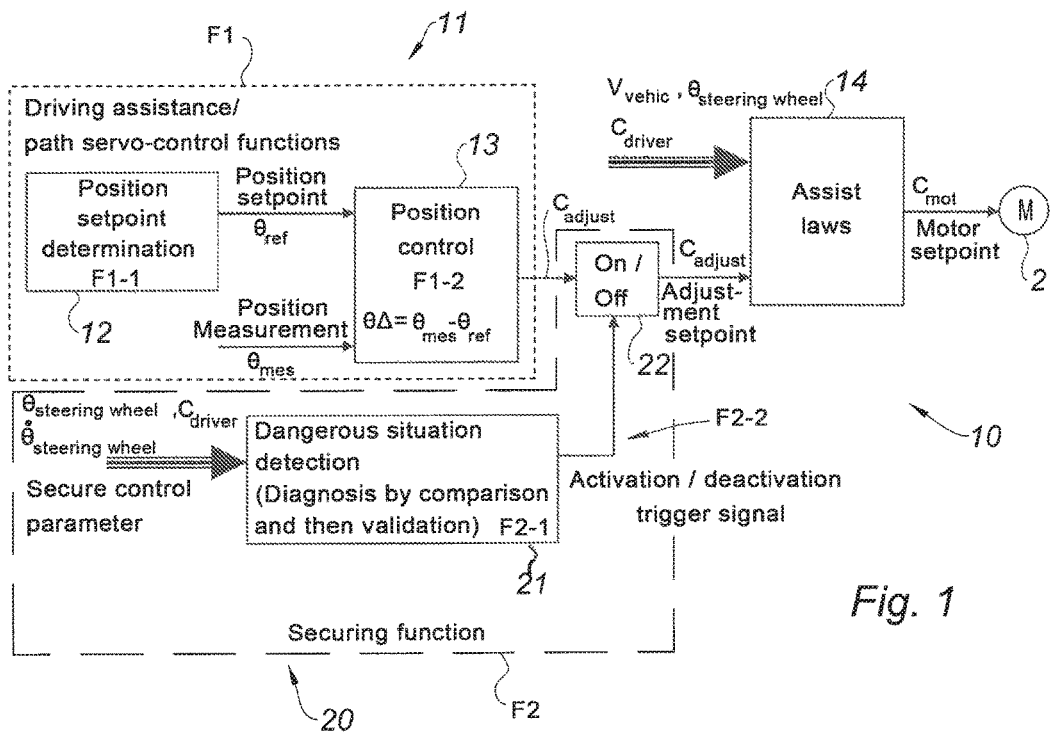
FIG. 1 illustrates, according to a block diagram, the general principle of implementation of a method according to the invention.

According to the invention, and as illustrated in FIG. 1, the method comprises at least one path control function F1, according to which a motor setpoint $C_{mot}$ is automatically adjusted and applied to the assist motor 2 so that the vehicle automatically follows an actual path which is close to, or coincides with, a reference path that the vehicle is desired to follow, and more particularly according to which a position setpoint $\theta_{ref}$ is automatically determined based on a reference path that the vehicle is desired to follow, and then a motor setpoint $C_{mot}$ that is applied to the assist motor 2 is automatically adjusted so as to make the effective position $\theta_{mes}$ of the steering converge toward said position setpoint $\theta_{ref}$.

In particular, the path control function F1 may consist of an automatic piloting function for parking maneuver (generally known under the name «park assist»), in particular for reverse parking maneuver, and more particularly an automatic piloting function for performing parallel parking, or in a particularly preferred manner, an automatic piloting function for following a traffic lane (generally known under the name «lane keeping»).

In what follows, for convenience, reference will be thus made to such a traffic lane following function («lane keeping»).

The position setpoint $\theta_{ref}$ applied at a considered instant will correspond to a target-position, calculated by a position setpoint determination sub-function F1-1, and in which the steering mechanism must be placed so as to make the vehicle able, in the life situation of said vehicle, to adopt a steering angle of the steered wheels which allows the vehicle to follow an actual path which gets as close as possible to the predetermined reference path (within a predefined tolerance margin), and ideally which coincides with, the predetermined reference path.

In other words, the path control function will consist in ensuring an automatic piloting of the vehicle allowing keeping the actual path of the vehicle in the vicinity of the (ideal) reference path, by carrying out the necessary path corrections (and therefore the position setpoint adjustments) in real-time.

In practice, the position setpoint $\theta_{ref}$ will be therefore variable over time, both in sign (left/right) and in intensity (magnitude of the steering angle), depending on the targeted reference path and on the corrections performed.

Advantageously, the reference path will be automatically constructed, among others, from data relating to external parameters related to the environment of the vehicle, such as the distance separating a portion of the vehicle from an external obstacle (for example another parked vehicle) or the relative position of the vehicle with respect to an external reference, for example with respect to a separation line of the traffic lanes.

These data may be acquired, substantially in real-time, by any appropriate measurement, carried out for example by means of contactless sensors (cameras, optical sensors, ultrasonic sensors, etc.).

Thus, for example, the monitoring of the traffic lane, and therefore the definition (construction) of the reference path (or path corrections) corresponding to the course of said traffic lane, no matter said course is straight or curved, may be carried out by means of cameras capable of detecting the limit marking of the traffic lane and measuring the position of the vehicle with respect to said marking.

The information provided by the collected data will allow determining the situation of the vehicle in its environment (position, orientation, speed, etc.) at the considered instant, and therefore proposing, in a reference frame external to the vehicle, a path (or path corrections) adapted at once to said environment, to the dynamics of the vehicle (determined in particular depending on the longitudinal speed, on the forces exerted on the rack and/or on lateral dynamic parameters such as the yaw speed or the lateral acceleration) and, of course, to the targeted automatic piloting operation.

The (instantaneous) effective position $\theta_{mes}$ of the power steering may be obtained by any measurement by means of an appropriate position sensor, such as for example by a measurement of the linear position of the rack or, preferably, by a measurement of the angular position $\theta_{steering\ wheel}$ of the steering wheel 1 (also called «steering wheel position» or «steering wheel angle») or, in an equivalent manner, by a measurement of the angular position of the shaft of the assist motor 2 provided that the mechanical reduction ratio of the kinematic chain which links the assist motor 2 to said steering wheel 1 is known.

Where appropriate, the angular position of the shaft of the assist motor 2 may be determined by means of a «resolver» type sensor, preferably integrated to the assist motor.

As illustrated in FIG. 1, the path control function F1 will comprise a sub-function F1-2 called «position control» sub-function, which will allow elaborating, from the knowledge of the position setpoint $\theta_{ref}$ and of the effective position of the steering $\theta_{mes}$, an adjustment setpoint $C_{adjust}$ which will allow adjusting the motor setpoint $C_{mot}$.

In practice, the method may be implemented by a power steering management module 10.

To this end, said management module 10 may comprise a (first) path control branch 11 which includes a position setpoint determination unit 12 for defining a reference path that the vehicle is desired to follow, a follower unit 13 which calculates the deviation $\Delta\theta$ between the actual path of the vehicle and the reference path in order to output an adjustment setpoint $C_{adjust}$ which is used at the input of a motor setpoint calculation unit 14 which in turn emits a motor setpoint $C_{mot}$ toward an assist motor 2, so that the adjustment setpoint $C_{adjust}$ could be taken into consideration for adjusting the motor setpoint $C_{mot}$ applied to the assist motor 2 in order to reduce the deviation $\Delta\theta$ between the actual path of the vehicle and the reference path.

More particularly, to this end, said management module 10 may comprise a (first) path control branch 11 which includes a position setpoint determination unit 12 for defining a position setpoint $\theta_{ref}$ of the power steering from a reference path that the vehicle is desired to follow, a follower unit 13 which calculates, according to a sub-function F1-2 called «position control» sub-function, the deviation $\Delta\theta=\theta_{mes}-\theta_{ref}$ (the same notation convention $\Delta\theta$ used in the previous paragraph is preserved, for convenience) between the effective position $\theta_{mes}$ of the steering and said position setpoint $\theta_{ref}$ in order to output an adjustment setpoint $C_{adjust}=f(\Delta\theta)$ which is used at the input of a motor setpoint calculation unit 14 which in turn emits, according to predetermined assist laws, a motor setpoint $C_{mot}$ toward an assist motor 2, so that the adjustment setpoint $C_{adjust}$ could be taken into consideration for adjusting the motor setpoint $C_{mot}$ applied to the assist motor 2 in order to reduce the deviation Δθ between the effective position of the steering and the position setpoint (and ideally make this deviation converge toward zero).

Hence, where appropriate, this first branch 11 will allow realizing a closed-loop type path control.

In a manner known per se, the assist laws used by the motor setpoint calculation unit 14 may take into consideration different input signals, such as the steering wheel angle (angular position of the steering wheel) $\theta_{steering\_wheel}$, the longitudinal speed $V_{vehic}$ of the vehicle, and/or the driver torque $C_{driver}$, for example for defining, in a conventional manner, an assist force, intended to amplify the manual force supplied by the driver in order to facilitate a (manual) steering maneuver.

According to a particularly preferred variant, the motor setpoint calculation unit 14 will be arranged to enable a driver torque (closed-loop type) control, according to which is measured the effective driver torque $C_{driver}$ which is actually exerted, at the considered instant, by the driver on the steering wheel 1, and then said effective driver torque $C_{driver}$ is compared with a predetermined driver torque setpoint $C_{driver\_ref}$ in order to assess a driver torque deviation which corresponds to the difference between said driver torque setpoint $C_{driver\_ref}$ and the effective driver torque $C_{driver}$, and then is determined, from this driver torque deviation, a motor torque setpoint $C_{mot}$ intended to be applied to the assist motor 2 in order to reduce said driver torque deviation.

According to such a variant, the adjustment setpoint $C_{adjust}$ may form (when the path control function F1 is active) the aforementioned driver torque setpoint $C_{driver\_ref}$, that is used at the input of the motor setpoint calculation unit 14 (that is to say when $C_{adjust}=C_{driver\_ref}$), thus enabling the path control function F1 to automatically (and actively) pilot the driver torque control function.

According to the invention, the method comprises a securing function F2, distinct from the path control function F1 and which meets an ASIL safety level higher than said path control function according to the safety standard ISO-26262.

Said securing function F2 comprises a diagnosis sub-function F2-1 according to which is monitored a control parameter $\theta_{steering\_wheel}$, $C_{driver}$, $\dot{\theta}_{steering\_wheel}$, wherein the said control parameter is representative of the vehicle behavior, and wherein said control parameter is «secured» at an ASIL level equal to or higher than the overall ASIL level that is required for the securing function F2.

Figure 3:
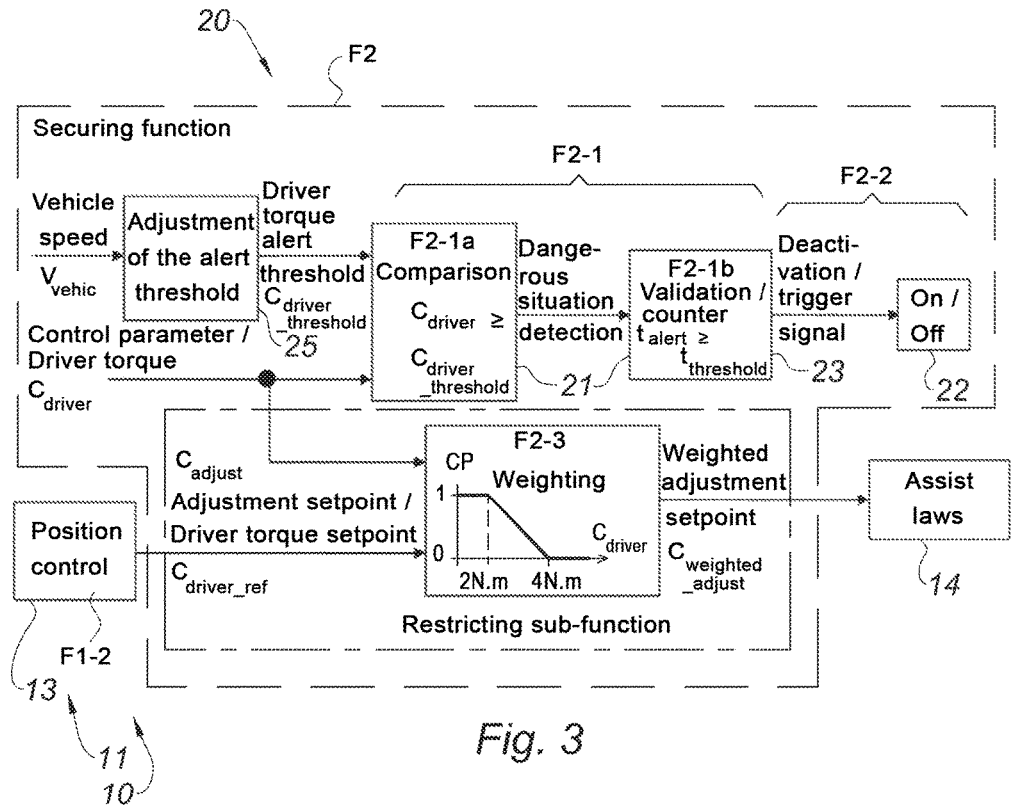
FIG. 3 illustrates, according to a block diagram, the detail of a second embodiment of a securing function in accordance with the invention.
Figure 4:
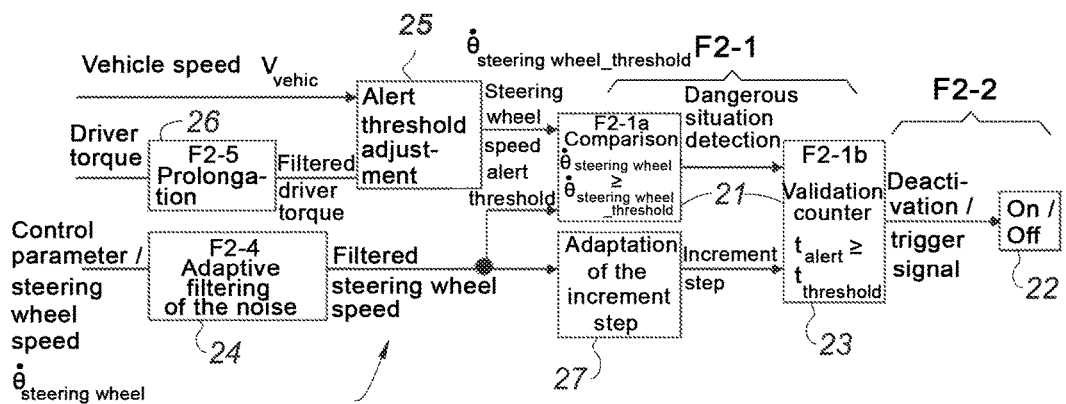
FIG. 4 illustrates, according to a block diagram, a third embodiment of a securing function in accordance with the invention.

For example, said control parameter may be a measurement or an estimate of the angular position $\theta_{steering\_wheel}$ of the steering wheel (in particular in the first example of FIG. 2), a measurement or an estimate of the driver torque $C_{driver}$ (also called «steering wheel torque») exerted by the driver on the steering wheel 1 (in particular in the second example of FIG. 3), or a measurement or an estimate of the angular rotational speed $\dot{\theta}_{steering\_wheel}$ of the steering wheel (in particular in the third example of FIG. 4).

Advantageously, the diagnosis sub-function F2-1 allows monitoring the control parameter in order to detect, by comparison of said control parameter (preferably considered in absolute value) with a predetermined alert threshold, herein $\theta_{steering\_wheel\_threshold}$, $C_{driver\_threshold}$, $\dot{\theta}_{steering\_wheel\_threshold}$ respectively, the occurrence of a predefined alert situation, considered as dangerous.

Afterwards, the securing function F2 comprises an intervention sub-function F2-2 according to which, in the case of detection of an alert situation, the moderation and/or the neutralization of the path control function F1 is forced.

In practice, as illustrated in FIG. 1, the management module 10 may comprise to this end a (second) securing branch 20, forming a ramification which is distinct from the path control branch 11 and the ASIL safety level of which is higher than the ASIL safety level of said path control branch in view of the safety standard ISO-26262, said securing branch 20 comprising a diagnosis unit 21 which receives at the input a (secure) control parameter $\theta_{steering\_wheel}$, $C_{driver}$, $\dot{\theta}_{steering\_wheel}$ representative of the vehicle behavior, such as a measurement or an estimate of the angular position of the steering wheel $\theta_{steering\_wheel}$, a measurement or an estimate of the driver torque $C_{driver}$ exerted by the driver on the steering wheel, or a measurement or an estimate of the angular rotational speed of the steering wheel $\dot{\theta}_{steering\_wheel}$, and which compares said control parameter with a predetermined alert threshold $\theta_{steering\_wheel\_threshold}$, $C_{driver\_threshold}$ or $\dot{\theta}_{steering\_wheel\_threshold}$ respectively, in order to detect a predefined alert situation, considered as dangerous, and which transmits, in the case of detection of an alert situation, a trigger signal to an intervention unit 22 interposed on the connection branch which links the output of the follower unit 13 to the input of the motor setpoint calculation unit 14, so as to force the reduction or even the cancelling of the adjustment setpoint $C_{adjust}$, preferably by material or virtual opening of the connection branch.

As indicated hereinabove, separating the path control F1, 11 and the securing F2, 20 functions (and therefore branches) one from the other advantageously allows a parallel course of these functions, so that the (normal) automatic course of each function F1, F2 may therefore be autonomous and independent from the course of the other function F2, F1, and possibly desynchronized from said course of the other function F2, F1.

In particular, this separation avoids to the necessity of integrating secure signals or secure algorithms within the path control function F1 as such, which would slow down the execution of said path control function.

Thus, it is possible to perform a low-cost, efficient and reactive path control F1, while meeting high safety requirements, guaranteed by the presence of the securing function F2 which, in case of detection of a dangerous situation, in which the continuation of the automatic execution of the path control F1 would endanger the safety of the vehicle or of its occupants, interrupts the effect of the path control in order to confer preponderance, or even exclusivity, to the driver and to the manual piloting (an in particular to the conventional assistance functions).

Advantageously, the securing function F2, which does not slow down nor does it disturb the normal course of the path control F1, as long as said path control is carried out under operating conditions considered as satisfactory, can however, at any useful time, act by suspending the contribution of the path control function F1 in the definition process of the steering behavior, and more particularly in the motor setpoint $C_{mot}$ determination process, in order not to let the automatic piloting engage the vehicle in a situation which is not controllable by the driver.

Advantageously, the securing function F2, external to the path control function F1, is therefore capable of causing an asynchronous interruption of said path control function F1, either by moderating, or by neutralizing said path control function F1.

In absolute terms, it would be conceivable that the intervention sub-function F2-2 simply forces the moderation of the path control function F1, that is to say that said intervention sub-function causes an attenuation, but without total suppression, of the effect of the adjustment setpoint $C_{adjust}$, for example by forcing reduction (to a "suitable" level considered as appropriate to the situation), but without cancellation, of the (absolute) value of said adjustment setpoint $C_{adjust}$.

Nonetheless, for simplicity of production, reactivity, and effectiveness, the intervention sub-function F2-2 will preferably constitute a neutralization sub-function according to which the path control function F1 is neutralized if an alert situation (dangerous situation) is detected by the diagnosis sub-function F2-1, so as to deprive the path control function F1 of any influence on (of any participation in) the determination of the motor setpoint $C_{mot}$.

In practice, the trigger signal may therefore constitute a deactivation signal, which controls the disconnection of the path control branch 11, in order to isolate the latter by interrupting the transmission of the adjustment setpoint $C_{adjust}$.

To this end, the intervention unit 22 may advantageously, as illustrated in FIGS. 1 to 4, comprise or be formed by a switch («on/off») actuated by the trigger signal.

Preferably, such a switch may perform a material disconnection of the path control branch 11.

Possibly, the absence of an adjustment setpoint $C_{adjust}$ at the input of the motor setpoint calculation unit 14 may be tantamount to a cancelling of said adjustment setpoint. In this case, the intervention unit 22 may, alternatively, perform a virtual disconnection by forcing the setting of the adjustment setpoint $C_{adjust}$ to zero.

Moreover, it will be noted that the disconnection, regardless of its form, does not necessarily cause the termination of the path control function F1, which may remain active and continue to be executed and to be refresh as a background task, so as to be able to be immediately operational if the disappearance of the dangerous situation brings the securing function F2 to order the reconnection of said path control function F1 (that is to say if the securing function orders effectively resuming the automatic piloting).

Preferably, the securing function F2 has a safety level equal to or higher than ASIL-B, preferably equal to or higher than ASIL-C, or even equal to ASIL-D.

Securing the corresponding branch 20 may be easily achieved, on the one hand, by using secure signals (control parameter(s)) already available within the power steering, and having (already) a sufficient ASIL level, that is to say equal to or higher than the level targeted for the securing function F2 and, on the other hand, by using for carrying out said securing function F2, and in particular for the diagnosis F2-1 and intervention F2-2 sub-functions, algorithms which will be secured at least at the targeted global ASIL level.

In this respect, it will be noted for example that the driver torque $C_{driver}$, which may be advantageously measured by an electromagnetic sensor sensitive to the deformations of a torsion bar interposed between the steering wheel 1 and the steering column 3, is generally available with a safety degree ASIL-D.

Similarly, the angular rotational speed $\dot{\theta}_{steering\ wheel}$ of the steering wheel may be assessed with a safety level ASIL-D from the rotational speed of the shaft of the assist motor 2, which in turn is measured by means of a speed sensor integrated to said assist motor.

The angular position of the steering wheel $\theta_{steering\ wheel}$ may be obtained with an ASIL level equal to or higher than B, and in particular equal to D, for example from a measurement of the angular position of the shaft of the assist motor 2, or indirectly, from a calculation involving other signals which are secured as such (said signals and said calculation having as such an ASIL level equal to or higher than the level that is desired to be guaranteed for the position of the steering wheel that is sought to be determined), and for example from a calculation of the forces which are exerted on the steering mechanism (typically a calculation of the forces exerted on the tie rods or on the rack) and which may be estimated from the secure signal (ASIL-D) of the driver torque $C_{driver}$ and of the secure signal (ASIL-D) of the torque delivered by the assist motor 2.

As an indication, the linear speed of the vehicle $V_{vehic}$ may be in turn generally obtained, if necessary, with a safety level ASIL B or even C.

The processing algorithms used in the securing branch 20 will also be secured up to the targeted ASIL level, bearing in mind that, regardless of their complexity and, if applicable, regardless of their relatively slow execution due to the presence of redundancies or safety controls, the course of said processing algorithms will be carried out in masked time with respect to the path control function F1, and will therefore not degrade in any way the performances of said path control function F1.

The global safety level of the management method, advantageously equal to the level of the securing function F2, and guaranteed in fine by said securing function F2, may therefore be very high, and meet a particularly demanding specification.

In turn, the path control function F1 may be content with any freely chosen safety level, lower than the level of the securing function F2, and has for example a safety level ASIL-A, or even a QM («Quality Management») level which is barely constraining, even not constraining at all.

In particular, this will make it possible practically implementing said path control function F1 by means of members, and in particular sensors, which are simple, inexpensive and space-saving, in particular without these members having to be intrinsically certified for a given ASIL level.

Advantageously, the combination, according to the architecture proposed by the invention, of a particularly reliable securing function F2 and of a particularly reactive path control function F1 will make, at a lower cost, the management method according to the invention compatible with the implementation of driving assistance functions in a high speed $V_{vehic}$ situation, for example when the vehicle circulates on highway.

Figure 2:
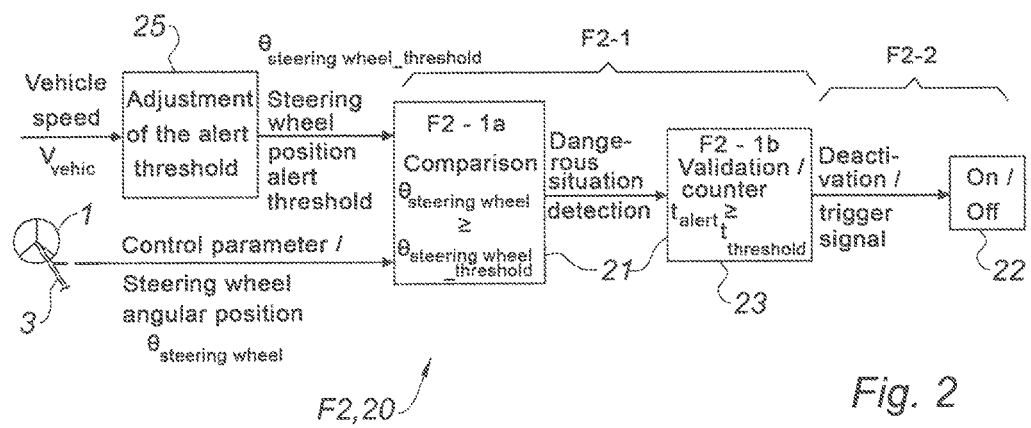
FIG. 2 illustrates, according to a block diagram, the detail of a first embodiment of a securing function in accordance with the invention.

Preferably, as illustrated in particular in FIGS. 2 to 4, the diagnosis sub-function F2 includes a comparative analysis step (F2-1a), comprising comparing the instantaneous value of the control parameter $\theta_{steering\ wheel}$, $C_{driver}$, $\dot{\theta}_{steering\ wheel}$ with the predetermined alert threshold $\theta_{steeringwheel\_threshold}$, $C_{driver\_threshold}$, $\dot{\theta}_{steering\ wheel\_threshold}$, and then a validation step (F2-1b) comprising assessing, in case of a crossing of the alert threshold, the holding duration $t_{alert}$ during which the control parameter is kept above said alert threshold, and concluding that an alert situation occurred if said holding duration $t_{alert}$ exceeds a predetermined duration threshold $t_{threshold}$, that is to say when $t_{alert} \geq t_{threshold}$.

In other words, the intervention F2-2 aiming to neutralize the action of the path control function F1 will be triggered only if the alert situation, considered as dangerous, fulfills a dual condition, namely an intensity condition (characterized by the value of the control parameter) and a duration condition. This will allow distinguishing real defects from simple transient peaks of the control parameter, and therefore avoiding any inadvertent triggering of the intervention sub-function F2-2 by a "false positive".

The timing of the holding duration $t_{alert}$ may be carried out by any appropriate means, such as a clock or a counter 23.

Preferably, the validation step (F2-1b) will use an incremental counter 23, the increment step of which may be preferably adapted depending on the rotational speed $\dot{\theta}_{steering\_wheel}$ of the steering wheel 1, as illustrated in FIG. 4.

Such an arrangement will enable the securing function F2 to react more quickly when the steering wheel 1 turns rapidly than when said steering wheel turns slowly, so as not to leave time for the path control function F1, in case of a dangerous situation, to significantly modify the steering angle, and therefore the path, of the vehicle.

Concretely, it is therefore possible to prevent, for example, the path control function F1 from causing a sudden change of the traffic lane of the vehicle, even before the driver has time to react and to regain control of the steering wheel so as to oppose this undesired action from the automatic piloting.

Of course, it is not excluded to adapt, for a similar aim of reactivity, the increment step of the counter 23 according to other parameters, such as for example the longitudinal speed of the vehicle.

As a non-limiting example, the increment step may be set to 200 units/ms, and the count threshold to 1000 units, so that said count threshold will be reached in 5 ms (five milliseconds), that is to say that we will have a duration threshold $t_{threshold}$=5 ms.

If the increment step is brought to 1000 units/ms, for example in order to take account of a high rotational speed of the steering wheel 1, the same count threshold will be reached in $t_{threshold}$=1 ms (one millisecond), which is tantamount to lower the duration threshold $t_{threshold}$ from which the intervention sub-function F2-2 is triggered.

Moreover, the applicable duration threshold $t_{threshold}$ may depend on the used control parameter.

In practice, when the used control parameter is the driver torque (steering wheel torque) $C_{driver}$, the duration threshold $t_{threshold}$ may be, as an indication, of about 20 ms.

When the used control parameter is the angular rotational speed of the steering wheel $\dot{\theta}_{steering\_wheel}$, the duration threshold $t_{threshold}$ may be, as an indication, comprised between 15 ms and 500 ms (and adjusted depending on the value of the rotational speed of the steering wheel so that, preferably, the duration threshold decreases if the rotational speed of the steering wheel increases).

When the used control parameter is the angular position of the steering wheel $\theta_{steering\_wheel}$, the duration threshold $t_{threshold}$ may be, as an indication, of about 500 ms.

Preferably, according to a feature which may constitute an invention on its own (in particular regardless of the ASIL level of the securing function F2), and as illustrated in FIG. 3, the securing function F2 comprises a driver torque permanent restricting sub-function F2-3, distinct from the diagnosis sub-function F2-1 and from the intervention sub-function F2-2, and which acts in parallel with said diagnosis and intervention sub-functions, by dynamically adjusting a weighting coefficient CP that it applies to the path control function F1 so as to permanently keep the driver torque $C_{driver}$, which is effectively felt by the driver at the steering wheel 1, below an admissible maximum driver torque.

Advantageously, this restricting sub-function F2-3 allows limiting the extent, and therefore the consequences, of a possible failure of the path control function F1, by limiting at any time, whatever happens, the adjustment setpoint $C_{adjust}$, derived from said path control function F1, that is to say the setpoint which is finally emitted by the path control function F1, and which is effectively applied at the input of the motor setpoint calculation unit 14 so as to be taken into consideration by the assist laws.

In other words, the restricting sub-function F2-3 acts on the control signal that constitutes the request which is emitted by the position control toward the assist laws and the motor torque generator, by restricting, or by reducing the extent of said signal, by weighting.

More particularly, as illustrated in FIG. 3, the weighting coefficient CP is applied to the adjustment setpoint $C_{adjust}$ (herein formed by a driver torque setpoint $C_{driver\_ref}$ in said FIG. 3) derived from the position control follower unit 13, so that it is a weighted adjustment setpoint $C_{weighted\_adjust}$=CP×$C_{adjust}$ (and more particularly, herein, a weighted driver torque setpoint CP×$C_{driver\_ref}$) which is applied at the input of the motor setpoint calculation unit 14, for the execution of the assist laws.

Thus, even in the case where a failure of the path control function F1 would tend to generate an abnormally high adjustment setpoint, the restricting sub-function F2-3 allows limiting, in fine, the driver torque $C_{driver}$ that is undergone by the driver, to the extent that said driver torque results from applying an adjustment setpoint $C_{adjut}$, $C_{weighted\_adjust}$ which is restricted, or attenuated, as such by the weighting which is applied by the restricting sub-function F2-3.

In other words, thanks to the additional safety offered by the restricting sub-function F2-3, the path control function F1 cannot cause, by itself, the occurrence of a driver torque $C_{driver}$ which would reach or exceed an admissible maximum threshold, considered as critical for the safety of the driver.

Thus, whatever the circumstances, the path control function F1 will never be likely to cause a sudden runaway of the assist motor 2.

This is particularly true if a failure of said path control function F1 causes the occurrence of a dangerous situation, or occurs simultaneously with a dangerous situation. In such a case, the restricting sub-function F2-3 is capable of ensuring (where appropriate, more rapidly than the diagnosis F2-1 and intervention F2-2 sub-functions) an immediate first protection of the driver, in particular during the time period which is necessary for the diagnosis sub-function F2-1 to detect the dangerous situation and for the intervention sub-function F2-2 to intervene and neutralize the path control (herein faulty) function F1.

Hence, the restricting sub-function F2-3 advantageously completes the securing function F2, to the extent that said restricting sub-function F2-3 contribute to prevent the occurrence of peak of the driver torque $C_{driver}$, thus allowing, where appropriate, having more time to react when facing a dangerous situation, by preventing said dangerous situation from totally degenerating (that is to say by preventing it from becoming rapidly uncontrollable and/or causing particularly serious and irreversible consequences).

The admissible maximum torque will be predetermined so that, even when the driver torque $C_{driver}$ reaches such an intensity, on the one hand, the steering wheel cannot forcibly and violently drive the arm of the driver with the risk of causing an injury (such as a sprain) but also, on the other hand, it remains possible for the driver to manually force, against this driver torque and the assist motor 2, the steering maneuver so as to keep the (manual) control of the vehicle.

As an indication, the value of the admissible maximum driver torque may be chosen between 2 N·m and 4 N·m, and for example in the range of 3 N·m.

To this end, it is possible for example to use as a law for adjusting the weighting coefficient CP, as illustrated in FIG. 3, a function which associates the value CP=1 to any driver torque $C_{driver}$ (measured) value lower than or equal to a first low threshold, herein 2 N·m, the value CP=0 to any driver torque $C_{driver}$ value equal to or higher than a second high threshold greater than the first low threshold, herein 4 N·m, and wherein the function has a decreasing transition, preferably linearly, between these two characteristic operating points (CP=1, $C_{driver}$=2 N·m) and (CP=0, $C_{driver}$=4 N·m).

It will be noted that, in this example, in the case of a failure tending to cause a runaway of the adjustment setpoint $C_{adjust}$, which would result in a runaway of the assist motor 2 (that is to say an unwanted very rapid and high-magnitude increase of the torque delivered by said assist motor 2, and consequently of the driver torque induced by the application of this motor torque against the driver), the application of the adjustment law of the weighting coefficient, executed by the restricting sub-function F2-3, will result in that the weighted adjustment setpoint $C_{weighted\_adjust}$, and therefore, where appropriate, the assist motor 2 piloted by this setpoint, may oscillate (at a frequency which will be in the same range as the frequency corresponding to the response time of the restricting sub-function F2-3) between an off-state (CP=0, in which said adjustment setpoint (and possibly, consequently in some cases, the assist motor) is placed by weighting when the driver torque $C_{driver}$ reaches the second high threshold of 4 N·m, and an on-state (CP>0, and in particular CP=1) in which said adjustment setpoint (and possibly, consequently in some cases, the assist motor) returns as soon as the previous off-state makes the driver torque $C_{driver}$ fall below the first low threshold of 2 N·m.

In practice, if the adjustment setpoint $C_{adjust}$ (and, possibly, subject to assist laws, the assist motor 2 itself) follows in this manner a cycle of successive shutdown and ignition (at a high frequency), corresponding to the alternation between the two aforementioned operating points, namely a first operating point with the (weighted) adjustment setpoint active, and the motor activated (CP=1, due to $C_{driver}$=2 N·m, and consequently $C_{weighted\_adjust}$=$C_{adjust}$) on the one hand, and a second operating point with the (weighted) adjustment setpoint reduced, even more particularly inhibited, by weighting, and possibly the motor deactivated (CP=0, due to $C_{driver}$=4 N·m, and consequently $C_{weighted\_adjust}$=0) on the other hand, then the runaway of the (weighted) adjustment setpoint, and therefore the possible runaway of the assist motor 2 which results from the application of this adjustment setpoint, will advantageously be contained around a "pivot" value corresponding to the average of the high and low thresholds, namely 3 N·m (=½×(2 N·m+4 N·m)).

Advantageously, it will be noted that the restricting sub-function F2-3 also fulfills a warning role, since said sub-function allows the tactile perception of a failure, as the driver would then feel, through the steering wheel 1 he is holding in hands, a driver torque $C_{driver}$, and therefore a relatively (abnormally) high resistance of the steering, without said driver torque being able to exceed an admissible maximum dangerousness threshold (4 N·m in the aforementioned example).

According to a preferable possible implementation, the securing function F2 includes, as illustrated in FIG. 4, an adaptive filtering sub-function F2-4 according to which a low-pass filter 24 is activated and applied to the control parameter $\theta_{steering\ wheel}$, $C_{driver}$ or, as is the case in FIG. 4, $\dot{\theta}_{steering\ wheel}$, in order to reduce the noise thereof, when said control parameter $\theta_{steering\ wheel}$, $C_{driver}$, $\dot{\theta}_{steering\ wheel}$ is in a range of values, called «Critical Range» CR, predefined in the vicinity of the alert threshold, and on the contrary, said low-pass filter 24 is deactivated when the control parameter is outside, and in particular beyond, said critical range CR.

Indeed, the inventors have observed that, when the control parameter $\theta_{steering\ wheel}$, $C_{driver}$, $\dot{\theta}_{steering\ wheel}$ is in the proximity (in particular in the lower proximity) of the alert threshold $\theta_{steering\ wheel\_threshold}$, $C_{driver\_threshold}$, $\dot{\theta}_{steering\ wheel\_threshold}$, the noise which affects the control parameter may artificially cause a crossing of said alert threshold, and therefore may distort the comparative analysis (F2-1a), which may lead to mistakenly diagnose the occurrence of a dangerous situation and therefore improperly interrupt the path control function F1.

This is why it is useful, in such situation, to filter the noise in order to reduce the sensitivity of the diagnosis sub-function F2-1 to false positives, and therefore favor the accuracy of the securing function F2.

In contrast, the inventors have also observed that the implementation of a low-pass filtering, intended to eliminate the noise (the frequency of which is generally high), delays the provision of the (filtered) control parameter at the input of the diagnosis unit 21 and therefore slows down the execution of the diagnosis sub-function F2-1, and more generally the execution of the securing function F2.

If such a slow-down (which typically brings the response time of the securing function to 100 ms) is acceptable as long as the maneuver of the steering is performed relatively slowly, it may however be prejudicial to the safety of the vehicle and of its occupants when the rotational speed of the steering wheel 1 is high (typically higher than 20 degrees/s), that is to say when the situation requires a rapid intervention (typically with a response time in the range of 5 ms) in order to avoid a significant modification of the path, in particular in order to avoid an accidental change of the traffic lane or leaving the road.

This is why the invention proposes not to permanently filter the control parameter (and more particularly, in the example of FIG. 4, not to permanently filter the rotational speed of the steering wheel $\dot{\theta}_{steering\ wheel}$), in order not to affect the general reactivity of the securing function F2, but to adapt the filtering by selectively activating the low-pass filter 24, and therefore by favoring the accuracy, only when it is really necessary for distinguishing a real alert situation from a mere false positive, and by deactivating said filter 24 in all other cases, in particular in a situation of rapid rotation of the steering wheel, when reactivity should be favored above all.

To this end, it is possible for example to set the high value $CR_{sup}$ of the critical range CR as equal to (or higher than) the alert threshold $\theta_{steering\ wheel\_threshold}$, $C_{driver\_threshold}$, $\dot{\theta}_{steering\ wheel\_threshold}$ increased by the predictable (or empirically observed) value of the noise BR affecting the signal of the control parameter, namely, in the example of FIG. 4: $CR_{sup}=\dot{\theta}_{steering\ wheel\_threshold}+BR$.

Indeed, if the measured value of the steering wheel speed is located beyond this high value $CR_{sup}$, we will be sure that, whatever the level of noise affecting the measurement is, the actual steering wheel speed will actually exceed the alert threshold $\dot{\theta}_{steering\ wheel\_threshold}$.

Conversely, it is possible to set, possibly, a low value $CR_{inf}$ of the critical range CR, below which filtering is considered to be useless, whatever the (noisy) measured value of the control parameter is, herein whatever the (noisy) measured value of the steering wheel speed is, since said measured value, in absolute terms or considering the evolution of said value at the considered instant, is lower than the alert threshold $\theta_{steering\ wheel\_threshold}$, $C_{driver\_threshold}$, $\dot{\theta}_{steering\ wheel\_threshold}$, and to low with respect to the alert threshold for the actual value of said control parameter (herein the actual value of the steering wheel speed) to have reached said alert threshold.

To this end, said low value $CR_{inf}$ may correspond in particular to the alert threshold: $CR_{inf}=\dot{\theta}_{steering\_wheel\_threshold}$, $C_{driver\_threshold}$, $\dot{\theta}_{steering\_wheel\_threshold}$.

In the example of FIG. 4, it is therefore possible to have $CR=[CR_{inf};CR_{sup}]=[\dot{\theta}_{steering\_wheel\_threshold};\dot{\theta}_{steering\_wheel\_threshold}+BR]$.

In any case, in order to avoid instabilities, the switching between the activation and the deactivation of the adaptive filtering may be carried out by a hysteresis switch.

Figure 5:
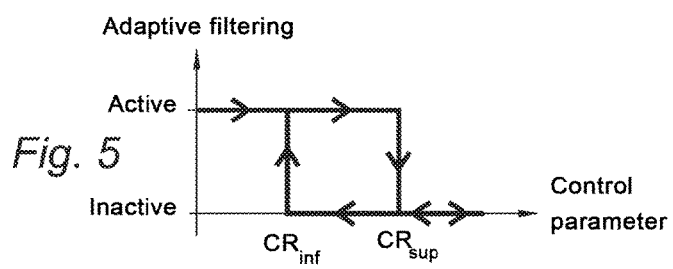
FIG. 5 illustrates the hysteresis switching principle of an adaptive filter usable to reduce the noise affecting the measurement of a control parameter used by a method according to the invention, in particular within the third example of implementation represented in FIG. 4.

This hysteresis switch may use as an upper switch value, as illustrated in FIG. 5, the high value $CR_{sup}$ of the critical range CR, so as to cause the deactivation of the filtering when the control parameter (herein the speed of the steering wheel), considered in absolute value, exceeds said switch value, that is to say when the control parameter becomes higher than the high value $CR_{sup}$.

Said switch may also use, as a lower switch value, the low value $CR_{inf}$ of the critical range CR, so as to cause the (re)activation of the filtering when the control parameter, herein the speed of the steering wheel, considered in absolute value, falls back below said low value $CR_{inf}$.

As an indication, and in particular in the example represented in FIG. 4, the alert threshold $\dot{\theta}_{steering\_wheel\_threshold}$ may be set to 20 degrees/s.

Since the noise BR affecting the measurement signal of the rotational speed $\dot{\theta}_{steering\_wheel}$ of the steering wheel 1 is likely to make this signal fluctuate by +/−2 degrees/s to +/−3 degrees/s, a false positive for example may occur, in the absence of filtering, at an actual rotational speed of the steering wheel of 17 degrees/s (if the noise distorts the measurement by increasing said measurement: actual 17 degrees/s+3 degrees/s due to noise=20 degrees/s measured, thus corresponding to the alert threshold).

Similarly, a crossing of the alert threshold may not be detected if the actual steering wheel speed, for example 22 degrees/s, or even almost 23 degrees/s, is diminished by the noise (actual 22 degrees/s−3 degrees/s due to noise=19 degrees/s measured<alert threshold).

In this example, it is therefore possible to choose to activate the filtering (and keep said filtering active) as long as the rotational speed of the steering wheel $\dot{\theta}_{steering\_wheel}$ remains lower than or equal to a high value $CR_{sup}$=23 degrees/s (=20 degrees/s corresponding to the alert threshold+3 degrees/s corresponding to the raw noise), that is to say as long as the raw noise is likely either to cause false positives or on the contrary to hide a real dangerous situation.

Conversely, it is possible to deactivate said filtering when exceeding this high value (upper switch value) $CR_{sup}$=23 degrees/s (or another predetermined slightly higher value, for example 25 degrees/s) beyond which, even if noise is present, we will be sure that the actual steering wheel speed would have anyway necessarily reached or exceeded the alert threshold (so that it is useless to seek a high accuracy, and therefore useless to resort to a filtering).

As an indication (and still with reference to the use of the steering wheel speed as a control parameter, and therefore to the steering wheel speed as an item subject to filtering), the filtering may allow attenuating the noise below 1 degree/s; thereby brining the accuracy of the diagnosis to +/−1 degrees/s.

Advantageously, the implementation of an adaptive filtering F2-4 will therefore allow combining reliability and reactivity of the securing function F2.

Moreover, preferably, and as illustrated in particular in FIGS. 2, 3 and 4, the alert threshold $\theta_{steering\_wheel\_threshold}$, $C_{driver\_threshold}$, $\dot{\theta}_{steering\_wheel\_threshold}$, of the securing function F2 is adjusted according to the linear (longitudinal) speed $V_{vehic}$ of the vehicle.

Thus, it is advantageously possible to adapt the securing conditions of the method, and in particular the triggering conditions of the intervention F2-2, to the speed of the vehicle, to the extent that it is quite understandable that the higher the speed $V_{vehic}$ of the vehicle, the more the time available to react (and in particular the time left for the driver to react) is reduced, and the more the consequences of a failure (and in particular of a path change or a road leaving) could be serious.

In practice, it is therefore possible to lower the alert threshold $\theta_{steering\_wheel\_threshold}$, $C_{driver\_threshold}$, $\dot{\theta}_{steering\_wheel\_threshold}$, in order to promote an early diagnosis and a rapid intervention of the securing function F2, when the speed of the vehicle $V_{vehic}$ increases and/or exceeds a predetermined speed threshold or, conversely, increase the alert threshold when the speed of the vehicle $V_{vehic}$ decreases and/or remains below said predetermined speed threshold.

As illustrated in FIGS. 2 to 4, the automatic modifications of the alert threshold will be carried out by an alert threshold adjustment unit 25, which will be placed at the input of the diagnosis unit 21 in order to set parameters of said diagnosis unit by setting the alert threshold $\theta_{steering\_wheel\_threshold}$, $C_{driver\_threshold}$, $\dot{\theta}_{steering\_wheel\_threshold}$, applicable at the considered instant.

According to a preferable possible implementation, which may constitute an invention on its own, the alert threshold $\theta_{steering\_wheel\_threshold}$, $C_{driver\_threshold}$, $\dot{\theta}_{steering\_wheel\_threshold}$ of the securing function F2 is adjusted according to the driver torque $C_{driver}$ exerted by the driver on the steering wheel 1, as illustrated in particular in FIG. 4.

In practice, the existence of a high driver torque $C_{driver}$ actually indicates that the steering wheel 1 is held by the driver, whereas, conversely, the driver torque $C_{driver}$ will necessarily remain low, or even substantially zero, if the steering wheel 1 is released and may move freely, according to the actions of the assist motor 2, without being disturbed in its displacement by a manual action of the driver.

Yet, in a held steering wheel situation, the driver will be more vigilant and more capable of reacting rapidly than in a released steering wheel situation.

Hence, it is possible to lower the alert threshold $\theta_{steering\_wheel\_threshold}$, $C_{driver\_threshold}$, $\dot{\theta}_{steering\_wheel\_threshold}$ when the steering wheel 1 is released, in order to increase the sensitivity of the detection of a dangerous situation and therefore accelerate the intervention of the securing function F2 in a situation where the driver is not very vigilant, so that the securing function F2 could overcome said lack of vigilance of the driver.

Conversely, it is possible to tolerate an increase of the alert threshold $\theta_{steering\_wheel\_threshold}$, $C_{driver\_threshold}$, $\dot{\theta}_{steering\_wheel\_threshold}$ when (as long as) the steering wheel 1 is held, that is to say as long as the driver torque is higher than a predetermined threshold.

Indeed, as long as the driver is vigilant and holds the steering wheel, a slight reduction of the sensitivity of the securing function F2 by increasing the alert threshold would not expose said driver to an increased risk of loss of control of his vehicle, or of worsening the consequences of a dangerous situation, since said driver can react effectively at any time by regaining the manual control of the steering.

On the contrary, the increase of the alert threshold in held steering wheel situation allows optimizing the operation of the method according to the invention, by triggering the intervention of the securing function F2 only to good use, according to criteria which are less tough in a held steering wheel situation (the securing function F2 being then more "permissive") than in a released steering wheel situation, thus avoiding in particular making said securing function F2 intervene while a maneuver is intentionally initiated by the driver and mastered by the latter.

In the example of FIG. 4, the steering wheel speed alert threshold $\dot{\theta}_{steering\ wheel\_threshold}$ will be raised when the driver torque $C_{driver}$ is high (higher than a predetermined threshold), in order not to uselessly trigger the securing function F2 when the driver holds the steering wheel 1 firmly.

Thus, if necessary, the driver can proceed to a rapid but voluntary steering maneuver (and therefore impart a high rotational speed to the steering wheel 1), for example in order to avoid an obstacle, without triggering the intervention of the securing function F2.

Conversely, this same steering wheel speed alert threshold $\dot{\theta}_{steering\ wheel\_threshold}$ will be lowered when the driver torque $C_{driver}$ will be low (lower than a predetermined threshold), so as to enable the securing function F2 to rapidly intervene for neutralizing the path control function F1 when a rapid rotation of the steering wheel is detected in the situation where the steering wheel is released.

Advantageously, the early intervention of the securing function F2 in a released steering wheel situation will stop the "mad rush" of the steering wheel 1 and leave time for the driver to react and regain control of the steering wheel 1 before the direction would automatically perform a non-desired high-magnitude movement and thus cause a dangerous displacement of the vehicle, for example a lane departure of said vehicle.

According to a preferable possible implementation which may constitute an invention on its own, applicable where appropriate to any method for managing a power steering involving the detection or the use of the held or released state of a steering wheel (and/or the management of the transitions between the released state and the held state or vice versa), the securing function F2 comprises, as illustrated in particular in FIG. 4, a prolongation sub-function F2-5, intended to virtually prolong a held steering wheel state.

This prolongation sub-function F2-5 is activated when an increase, in absolute value, of the driver torque $C_{driver}$ is perceived, and this prolongation sub-function F2-5 is deactivated when a decrease, in absolute value, of said driver torque $C_{driver}$ is perceived.

According to this prolongation sub-function F2-5, when said prolongation sub-function F2-5 is in activated state, taking into consideration the measured value of the driver torque $C_{driver}$ for adjusting the alert threshold $\dot{\theta}_{steering\ wheel\_threshold}$, $C_{driver\_threshold}$, $\dot{\theta}_{steering\ wheel\_threshold}$ of the securing function F2 is delayed, so as to delay, for a predetermined prolongation duration after a release of the steering wheel, the modification, and more particularly the reduction, of said alert threshold $\dot{\theta}_{steering\ wheel\_threshold}$, $C_{driver\_threshold}$, $\dot{\theta}_{steering\ wheel\_threshold}$.

Indeed, the inventors have observed that, the moment when the driver releases the steering wheel 1, a peak of the control parameter may occur, and more particularly a peak of the rotational speed of the steering wheel $\dot{\theta}_{steering\ wheel}$, for example because the driver, by acting manually, has pulled the vehicle away from its reference path so that, as soon as the steering wheel is released, the path control function F1 automatically and rapidly urges back the steering wheel 1 so as to make the vehicle return on said path.

Consequently, if we immediately consider, from the moment when the release of the steering wheel occurs, that we are in the released steering wheel situation and if we consequently lower the alert threshold of the securing function F2, as recited hereinabove, that is to say more particularly, in the example of FIG. 4, if the steering wheel rotational speed alert threshold $\dot{\theta}_{steering\ wheel\_threshold}$ is lowered because the driver torque $C_{driver}$ drops to a low value, the peak of the control parameter, and more particularly the steering wheel speed peak $\dot{\theta}_{steering\ wheel}$ in said example, although corresponding to a normal and danger-free situation (in particular, since the driver still has his hands proximate to the steering wheel and can therefore grasp said steering wheel rapidly if necessary), may be interpreted, wrongly, as an alert situation, and may thus uselessly trigger the intervention of the securing function F2.

Hence, the invention advantageously proposes filtering the signal of the driver torque $C_{driver}$ at the time when the steering wheel 1 is released, so as to introduce a delay in the acquisition and/or the processing of said signal and therefore maintain, for a short time period after the release of the steering wheel 1 (that is to say during the aforementioned prolongation duration), the fiction of a «held steering wheel» state.

In this instance, this will therefore allow preserving temporarily a high alert threshold $\theta_{steering\ wheel\_threshold}$, $C_{driver\_threshold}$, $\dot{\theta}_{steering\ wheel\_threshold}$, corresponding to such a «held steering wheel» state, so as to enable letting the normal and temporary peak of the control parameter pass, wherein said peak is the normal consequence of the steering wheel release, without triggering the intervention of the securing function F2.

In other words, the prolongation sub-function F2-5 allows postponing by a predetermined prolongation duration (delay), when (starting from) releasing the steering wheel 1, the switching operation of the alert threshold from the (high) value of said alert threshold, that is applicable in the held steering wheel situation, to the (low, lower than the high value) value that is applicable in the released steering wheel situation.

In particular, the prolongation duration (delay) may depend on the extent by which the vehicle has deviated from the reference path, under the action of the driver, and therefore depend on the time which is necessary to return to said reference path (typically, the time which is necessary to return in the traffic lane).

As an indication, said prolongation duration may be substantially comprised between 50 ms and 1 s, and more particularly between 50 ms and 250 ms.

In particular, this delay may be induced by a low-pass filter or by any equivalent retardant (timer) system.

Conversely, when regaining control of the steering wheel, the situation change should be taken immediately into consideration, and in particular the increase of the alert threshold (that is to say the return of said alert threshold to its high value) should be immediately enabled in order not to delay the update of the setting of the securing function F2 and therefore avoid any useless triggering of said securing function F2 in case of intentional manual maneuver.

In the example of FIG. 4, it will consist in making the steering wheel speed alert threshold $\dot{\theta}_{steering\ wheel\_threshold}$ return almost instantaneously to its high value, in order not to trigger the securing function F2 under the effect of a rapid manual steering maneuver (and therefore at a high steering wheel speed $\dot{\theta}_{steering\ wheel}$) which would be engaged voluntarily by the driver.

In other words, the prolongation function F2-5 will be therefore designed to filter the driver torque $C_{driver}$ when the driver releases the steering wheel 1, but not when the driver grasps again said steering wheel 1.

In practice, this prolongation function F2-5 may be implemented by means of a selective retardant filtering unit 26, such as a hysteresis switch, which sets (and holds) the retardant filtering in an active state if said switch perceives that the driver torque $C_{driver}$ is (in absolute value) in a decreasing phase (indicating a steering wheel release) and on the contrary deactivates said retardant filtering when it perceives that the driver torque is in an increasing phase (indicating holding or grasping again the steering wheel).

A more detailed description of the embodiments of FIGS. 2 to 4 and of their operation will now be provided, in order to better illustrate some possible and preferred combinations of the features described in the foregoing.

The first example, illustrated in FIG. 2, typically corresponds to a securing application in which the danger may be associated to a too high lateral dynamics of the vehicle (too high lateral acceleration or yaw speed), typically to a lateral acceleration higher than or equal to 0.3 G (0.3 times the gravitational acceleration).

Indeed, it will be understood for example that a path control function F1 of the lane-keeping type on highway is intended to pilot the vehicle at high linear speed $V_{vehic}$ according to straight or barely curved paths, so that a considerable lateral acceleration (which may correspond to a sudden and high-amplitude steering maneuver, for example) therefore indicates an anomaly of the behavior of the vehicle, that is incompatible with said path control function.

It will also be understood that it is preferable to intervene while the angular acceleration (or yaw speed) is still relatively low, because the vehicle is more easily controllable when it is (still) in a low lateral dynamic situation, rather than in a high angular acceleration or high yaw speed situation (typical for example of a skid or of a swerve).

Advantageously, and according to a feature which may constitute an invention on its own, it is possible to use the angular position of the steering wheel $\theta_{steering\ wheel}$ as a control parameter representative of the lateral dynamics of the vehicle.

Indeed, there is a relationship, called the Jeantaud-Ackermann relationship, between the lateral acceleration and the position of the steering wheel:

$$\theta_{sterringwheel} = K_{Jeantaud} \cdot \frac{L \cdot \gamma_{lateral}}{V_{vehic}^2}$$

With:
$\theta_{steeringwheel}$ the steering wheel angle
$K_{Jeantaud}$ the conversion gain between the wheel angle and the steering wheel angle
L the wheelbase of the vehicle
$\gamma_{lateral}$ the lateral acceleration
$V_{vehic}$ the linear speed of the vehicle Furthermore, it is easier and faster to acquire and process a signal (by comparing said signal to an alert threshold of the same nature) which is directly representative of the position of the steering wheel $\theta_{steering\ wheel}$ rather than providing for a secure algorithm (with the same ASIL level, in accordance with the level required for the securing function F2) which could calculate the lateral acceleration in real-time from said (measured) steering wheel position secure signal, and then compare this calculated lateral acceleration with a lateral acceleration alert threshold.

This is why the securing function F2 will be preferably executed by using (directly) the steering wheel position $\theta_{steering\ wheel}$ as a control parameter, and by determining the alert threshold $\theta_{steering\ wheel\_threshold}$ in the form of an equivalent steering wheel position (within the meaning of the Jeantaud-Ackermann relationship, which allows performing the conversion) from a alert threshold (typically 0.3 G) set for the lateral acceleration $\gamma_{lateral}$.

In this respect, it will be noted that, since the Jeantaud-Ackermann formula advantageously takes into consideration the linear speed of the vehicle, said formula will also allow the alert threshold adjustment unit 25 to intrinsically proceed to the adaptation of the alert threshold $\theta_{steering\ wheel\_threshold}$ depending on the linear speed $V_{vehic}$ of the vehicle.

Afterwards, this alert threshold $\theta_{steering\ wheel\_threshold}$, which is homogeneous with a steering wheel position, will be used to carry out the diagnosis sub-function F2-1, and more particularly the step (F2-1a) of direct comparison of the effective steering wheel $\theta_{steering\ wheel}$ position measured at the considered instant with this alert threshold $\theta_{steering\ wheel\_threshold}$.

In the case where the alert threshold is exceeded, and therefore a dangerous situation is detected, the counter 23 is progressively incremented.

If said counter 23 exceeds the predetermined duration threshold $t_{threshold}$, hereby confirming (validating) the existence of a dangerous alert situation, a deactivation signal is sent to the intervention unit 22 which neutralizes the path control function F1, by interrupting the adjustment setpoint signal $C_{adjust}$ that said path control function is emitting toward the motor setpoint calculation unit 14.

In other words, the path control function F1, protected by the securing function F2, is therefore disconnected in case of a dangerous situation.

Deprived of the automatic adjustment setpoint $C_{adjust}$ (cancelled by the disconnection), the motor torque setpoint calculation unit 14 will adapt the motor setpoint $C_{mot}$ so that the action of the assist motor 2 follows (and therefore assists) the manual maneuver of the steering wheel 1, which is tantamount to return control of the manual piloting of the power steering back to the driver (temporarily, as long as the alert situation persists).

In this respect, it will be noted that in a preferred variant, the assist laws are designed to carry out a control by the driver torque, that is to say designed to actuate the assist motor 2 so that the driver torque $C_{driver}$, which is effectively exerted and felt by the driver, corresponds to a theoretical driver torque which would normally be felt considering the dynamic situation of the vehicle and the effective angular position of the steering wheel (at the considered instant).

As example, in the absence of any adjustment setpoint $C_{adjust}$ coming from the path control function F1 and if the vehicle evolves in a straight line, then the felt driver torque $C_{driver}$ would be substantially zero if the steering wheel is in a centered position. Under these conditions, the assist motor 2 will therefore tend to act so as to make said driver torque converge toward zero.

On the contrary, if the vehicle is travelling in a turn, and the steering wheel is orientated in a non-centered (non-zero) angular position which substantially corresponds to the corner turning situation, then the felt driver torque $C_{driver}$ should be non-zero and correspond to the "normal" steering force (due to engaging or keeping the turning situation) of the steered wheels when turning (typically in the range of 3 N·m to 5 N·m). Under these conditions, the assist motor 2 will therefore tend to act so as to make said driver torque converge toward said non-zero "normal" steering force.

The second embodiment, illustrated in FIG. 3, typically corresponds to the securing of a «held steering wheel» life situation, in which the driver holds the steering wheel 1, and in which the danger may come from an excessive driver torque $C_{driver}$ which would be induced by a motor setpoint $C_{mot}$ which is too high, and which would be likely to drive the arm of the driver against his will, to make said driver release the steering wheel, or even to cause an injury to the driver (such as a sprain of the wrist).

In contrast with the first example, it is now the driver torque $C_{driver}$ which serves as a control parameter, and which is compared, during the diagnosis F2-1, with a torque alert threshold $C_{driver\_threshold}$, for the aforementioned reasons.

Nonetheless, elements similar to those of the first example are found in this second example, that enable a course of the method according to the same principle, namely: an alert threshold adjustment unit 25 which adjusts the driver torque alert threshold $C_{driver\_threshold}$ depending on the linear speed of the vehicle $V_{vehic}$, a diagnosis unit 21 which performs a comparison of the instantaneous value of the effective driver torque $C_{driver}$ with the driver torque alert threshold $C_{driver\_threshold}$, and an incremental counter 23 intended to time the holding duration $t_{alert}$ of a crossing of the alert threshold in order to validate the existence of an alert situation.

In this second example, a restricting sub-function F2-3 is added to the securing function F2, wherein said restricting sub-function allows, as described hereinabove, applying a weighting (between 0% and 100%, that is to say a weighting coefficient comprised between 0 and 1) to the signal to secure in fine, namely in this instance applying a weighting to the driver torque setpoint $C_{driver\_ref}$ in order to avoid a runaway of the adjustment setpoint $C_{adjust}$, and therefore of the driver torque $C_{driver}$ that is effectively undergone by the driver (and more particularly a runaway of the assist motor 2).

The third embodiment, illustrated in FIG. 4, typically corresponds to the securing of a «released steering wheel» life situation, in which the driver releases the steering wheel, and in which the danger is associated to a steering wheel rotational speed $\dot{\theta}_{steering\ wheel}$ which would be too fast to enable the driver to regain control of the steering wheel 1 in time in view of controlling the behavior of the vehicle.

Hence, the objective of the securing function F2 is to ensure that, in case of a dangerous situation, the (released) steering wheel will move at a sufficiently slow speed so as to leave time for the driver to react and therefore regain control of said steering wheel so as to manually correct the behavior of the vehicle.

The control parameter used in this instance is the rotational speed $\dot{\theta}_{steering\ wheel}$ of the steering wheel, which may be calculated from the «resolver» sensor of the assist motor 2, or from any other equivalent sensor.

Herein again, elements similar to those of the first and second examples are found for the same purpose as before, which elements allow the course of the method according to the same principle, namely: an alert threshold adjustment unit 25 which adjusts the steering wheel speed alert threshold $\dot{\theta}_{steering\ wheel\_threshold}$ depending on the linear speed of the vehicle $V_{vehic}$, a diagnosis unit 21 performing a comparison of the instantaneous value of the rotational speed of the steering wheel $\dot{\theta}_{steering\ wheel}$ with the steering wheel speed alert threshold $\dot{\theta}_{steering\ wheel\_threshold}$, and an incremental counter 23 intended to time the holding duration $t_{alert}$ of a crossing of the alert threshold in order to validate the existence of an alert situation.

This third example provides that the alert threshold, in this instance the steering wheel speed alert threshold $\dot{\theta}_{steering\ wheel\_threshold}$, is also adjusted depending on the driver torque $C_{driver}$.

Indeed, securing a path control function at high speed and in a released steering wheel situation imposes a low alert threshold, that favors reactivity in order to prevent the rapid, and therefore uncontrollable, occurrence of high-magnitude path deviations.

Conversely, in the held steering wheel situation, the driver can generate, through his manual steering maneuvers, steering wheel speeds that are greater than this low alert threshold, without these maneuvers being really dangerous. Hence, in the held steering wheel situation, the steering wheel speed alert threshold $\dot{\theta}_{steering\ wheel\_threshold}$ should be raised to a high (higher) value, so that the protection by the low alert threshold applies, ultimately, only in the released steering wheel situation.

Furthermore, the third embodiment includes a prolongation sub-function F2-5 which allows managing the transitions between the held steering wheel situation and the released steering wheel situation effectively, by selectively filtering the measured driver torque $C_{driver}$ before applying a filtered driver torque to the alert threshold adjustment unit 25.

As detailed hereinabove, this selective retardant filtering allows prolonging a held steering wheel situation fictitiously when the steering wheel is released, so as not to cause a too early switch of the alert threshold $\dot{\theta}_{steering\ wheel\_threshold}$ toward the low value of said alert threshold (and therefore avoid an hypersensitivity of the monitoring operation ensured by the securing function F2 during the held steering wheel/released steering wheel transition), while enabling conversely, when the driver regains control of the steering wheel, an immediate switching of the alert threshold $\dot{\theta}_{steering\ wheel\_threshold}$ toward its high value in order not to penalize the reactivity of the securing function in the held steering wheel situation.

In practice, the alert threshold adjustment unit 25 will therefore allow, as illustrated in FIG. 4, adjusting the steering wheel speed alert threshold $\dot{\theta}_{steering\ wheel\_threshold}$ depending on the speed of the vehicle and on the filtered driver torque.

Moreover, this third embodiment adds a unit 27 for adapting the increment step which allows adapting the increment step used by the counter 23, and expressed in units per millisecond, depending on the rotational speed of the steering wheel $\dot{\theta}_{steering\ wheel}$, and more particularly increasing (possibly proportionally increasing) said increment step with the rotational speed of the steering wheel, so as to obtain a reaction, and more particularly a detection and an intervention, of the securing function F2 which is/are more rapid when the steering wheel turns freely at high speed than when said steering wheel turns freely at a lower speed, and this in order to leave more time for the driver to regain control of the steering wheel by rapidly neutralizing a faulty path control, before the faulty path control has serious consequences.

Finally, this third example adds an adaptive filtering sub-function F2-4 intended to improve the accuracy of the measurement of the control parameter, herein the rotational speed of the steering wheel $\dot{\theta}_{steering\ wheel}$, by relieving said measurement at least partially from its background noise when said measurement is in the vicinity of the alert threshold and when it is therefore relevant to refine the accuracy of said measurement so as to avoid diagnosis errors without compromising the safety of the method.

Advantageously, this same adaptive filtering sub-function F2-4 automatically suppresses the filtering, in order not to delay the execution of the securing function F2, when the control parameter (the steering wheel speed) has a value much greater than the alert threshold $\dot{\theta}_{steering\_wheel\_threshold}$ and therefore means that, on the one hand, the crossing of said alert threshold is obvious and therefore does not require any particular guarantee about the measurement accuracy to obtain a safe and conclusive diagnosis and that, on the other hand, the extent of the rotational speed of the steering wheel $\dot{\theta}_{steering\_wheel}$, imposes favoring the reactivity of the securing function (and therefore deactivating the filtering) in order to avoid letting a dangerous situation degenerate significantly.

In the end, the steering wheel speed signal called «filtered steering wheel speed signal», derived from the noise filtering unit 24 (whether activated or not, depending on the situation), will be used at the input, on the one hand, of the diagnosis unit 21, for the detection of the crossing of the alert threshold $\dot{\theta}_{steering\_wheel\_threshold}$ and, on the other hand, herein, of the increment step adaptation unit 27, which will allow optimizing, herein again, the choice between performance (reactivity in a high steering wheel speed situation) and accuracy (when the steering wheel rotational speed is lower and when it is possible to have more time to diagnose a dangerous situation, with more certainty).

Of course, the invention concerns as such a module 10 for managing a power steering, allowing the implementation of a method according to the invention, and more particularly a management module 10 as described hereinabove.

Said management module 10, more particularly each of all or part of diagnosis 21, intervention 22, incremental counting (timing) 23, noise adaptive filtering 24, alert threshold adjustment 25, selective retardant filtering 26, or increment step adaption 27 units of said management module 10, may be formed by an electronic circuit, an electronic board, a calculator (computer), a programmable logic controller, or any other equivalent device.

Each of said modules or units may have a physical control structure, defined by the wiring of its electronic components and/or, preferably, a virtual control structure, defined by computer programming.

Furthermore, the invention also concerns, of course, a power steering system comprising a power steering mechanism piloted by an aforementioned management module, and therefore capable of implementing all or part of the method according to the invention.

The invention also concerns a motor vehicle, in particular with steered, possibly drive wheels, equipped with such a power steering system.

Finally, the invention concerns a data medium readable by a computer and containing computer program code elements ensuring the execution of a method according to any one of the features described in the foregoing when said medium is read by a computer.

Of course, the invention is in no way limited to the sole variants described in the foregoing, those skilled in the art being in particular capable of freely isolating or combining together either one of the aforementioned features, or substituting them with equivalents.

In particular, it is possible to consider the implementation of several distinct driving assistance functions (path control functions), including for example a «lane-keeping» assistance and/or an active «city-park» assistance, each being controlled by a securing function according to the invention (according to the general principle illustrated in FIG. 1), or all being controlled by the same common securing function.

The invention claimed is:

1. A module for managing a power steering comprising a path control branch which includes a position setpoint determination unit for defining a reference path that the vehicle is desired to follow, a follower unit which calculates the deviation between the actual path of the vehicle and the reference path in order to output an adjustment setpoint which is used at the input of a motor setpoint calculation unit which in turn emits a motor setpoint toward an assist motor, so that the adjustment setpoint could be taken into consideration for adjusting the motor setpoint applied to the assist motor in order to reduce the deviation between the actual path of the vehicle and the reference path, the management module comprising a securing branch, forming a ramification which is distinct from the path control branch and the ASIL safety level of which is higher than the ASIL safety level of said path control branch according to the safety standard ISO-26262, the securing branch comprising a diagnosis unit which receives at the input a control parameter, representative of the vehicle behavior, a measurement or an estimate of the driver torque exerted by the driver on the steering wheel, or a measurement or an estimate of the angular rotational speed of the steering wheel, and which compares the control parameter with a predetermined alert threshold, in order to detect a predefined alert situation, considered as dangerous, and which transmits, in case of detection of an alert situation, a trigger signal to an intervention unit interposed on the connection branch which links the output of the follower unit to the input of the motor setpoint calculation unit, so as to force the reduction or even the cancelling of the adjustment setpoint by opening of the connection branch.

2. A method of using the module of claim 1 for managing a power steering of a vehicle comprising at least one path control function, according to which a motor setpoint is automatically adjusted and applied to an assist motor of the power steering so that the vehicle automatically follows an actual path which is close to, or which coincides with, a reference path that the vehicle is desired to follow, the method comprising a securing function, distinct from the path control function and which meets an ASIL safety level higher than said path control function according to the safety standard ISO-26262, the securing function comprising a diagnosis sub-function according to which is monitored a control parameter, representative of the behavior of the vehicle, in order to detect, by comparison of the control parameter with a predetermined alert threshold, the occurrence of a predefined alert situation, considered as dangerous, the securing function comprising afterwards an intervention sub-function according to which, in case of detection of an alert situation, the moderation and/or the neutralization of the path control function is forced.

3. The method according to claim 1, wherein the diagnosis sub-function includes a comparative analysis step, during which the instantaneous value of the control parameter is compared with the predetermined alert threshold, and then a validation step during which is assessed, in case of a crossing of the alert threshold, the holding duration during which the control parameter is kept above the alert threshold, and the occurrence of an alert situation is concluded if the holding duration exceeds a predetermined duration threshold.

4. The method according to claim 3, wherein the validation step uses an incremental counter whose increment step is adapted depending on the rotational speed of the steering wheel.

5. The method according to claim 1, wherein the intervention sub-function constitutes a neutralization sub-function according to which the path control function is neutralized if an alert situation is detected by the diagnosis sub-function, so as to deprive the path control function of any influence on the determination of the motor setpoint.

6. The method according to claim 1, wherein the securing function comprises a driver torque permanent restricting sub-function, distinct from the diagnosis sub-function and from the intervention sub-function, and which acts in parallel with the diagnosis and intervention sub-functions, by dynamically adjusting a weighting coefficient that it applies to the path control function so as to permanently keep the driver torque, which is effectively felt by the driver at the steering wheel, below an admissible maximum driver torque.

7. The method according to claim 1, wherein the securing function includes an adaptive filtering sub-function according to which a low-pass filter is activated and applied to the control parameter in order to reduce the noise therefrom, when the control parameter is in a range of values, called «critical range», predefined in the vicinity of the alert threshold, and on the contrary, the low-pass filter is deactivated when the control parameter is outside the critical range.

8. The method according to claim 1, wherein the alert threshold of the securing function is adjusted according to the linear speed of the vehicle.

9. The method according to claim 1, wherein the alert threshold of the securing function is adjusted according to the driver torque exerted by the driver on the steering wheel.

10. The method according to claim 9, wherein the securing function comprises a prolongation sub-function, intended to virtually prolong a held steering wheel state, wherein the prolongation sub-function is activated when an increase, in absolute value, of the driver torque is perceived, and is deactivated when a decrease, in absolute value, of the driver torque is perceived, and according to which, when the prolongation sub-function is in its activated state, taking into consideration the measured value of the driver torque for adjusting the alert threshold of the securing function is delayed, so as to delay, for a predetermined prolongation duration after a release of the steering wheel, the modification of the alert threshold.

11. The power steering management module according to claim 1, wherein the path control branch includes a position setpoint determination unit for defining a position setpoint of the power steering from the reference path that the vehicle is desired to follow, a follower unit which calculates the deviation between the effective position of the steering and the position setpoint in order to output an adjustment setpoint which is used at the input of a motor setpoint calculation unit which in turn emits a motor setpoint toward an assist motor, so that the adjustment setpoint could be taken into consideration to adjust the motor setpoint applied to the assist motor in order to reduce the deviation between the effective position of the power steering and the position setpoint.

* * * * *